Oct. 25, 1938.  L. J. McGRATH  2,134,310
SHEET CUTTING AND PANELING MACHINE
Filed Oct. 1, 1935  3 Sheets-Sheet 1

INVENTOR.
Leigh J. McGrath.
BY
Chas. E. Townsend.
ATTORNEY.

Oct. 25, 1938. L. J. McGRATH 2,134,310
SHEET CUTTING AND PANELING MACHINE
Filed Oct. 1, 1935 3 Sheets-Sheet 2
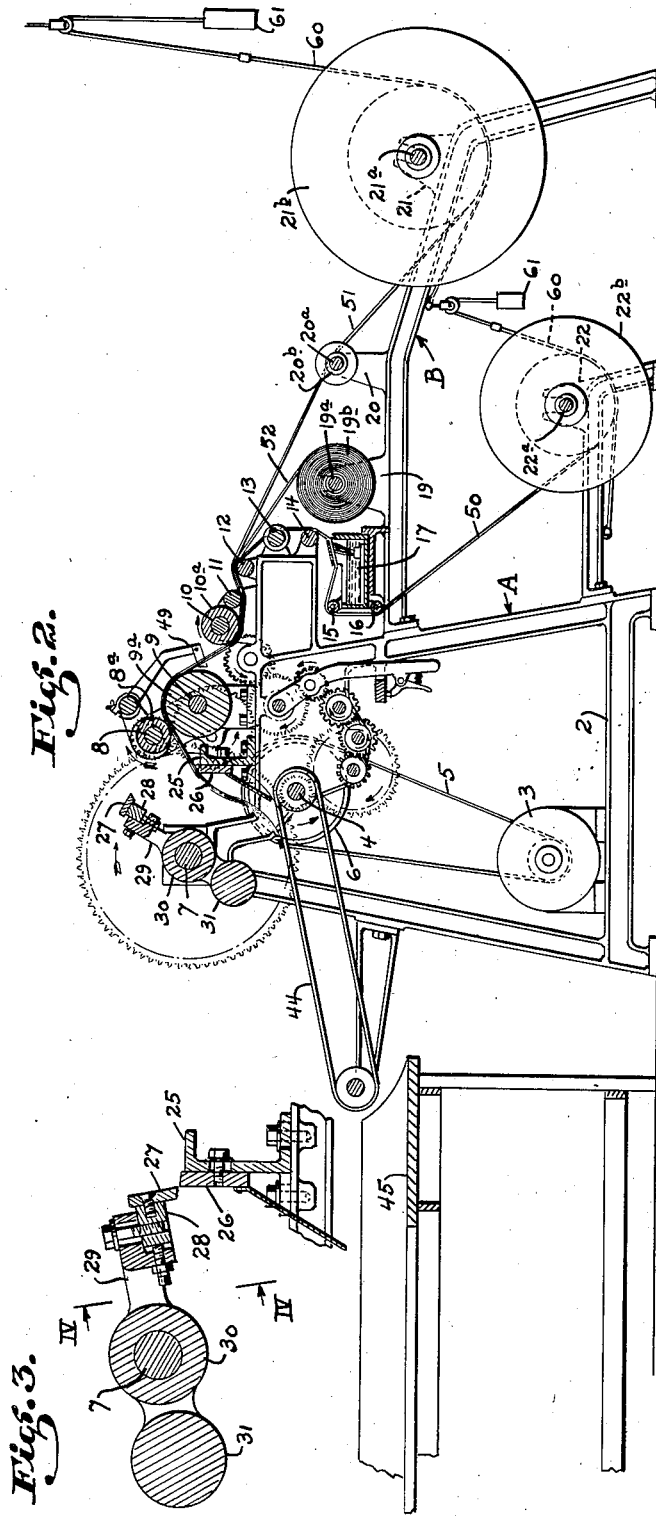
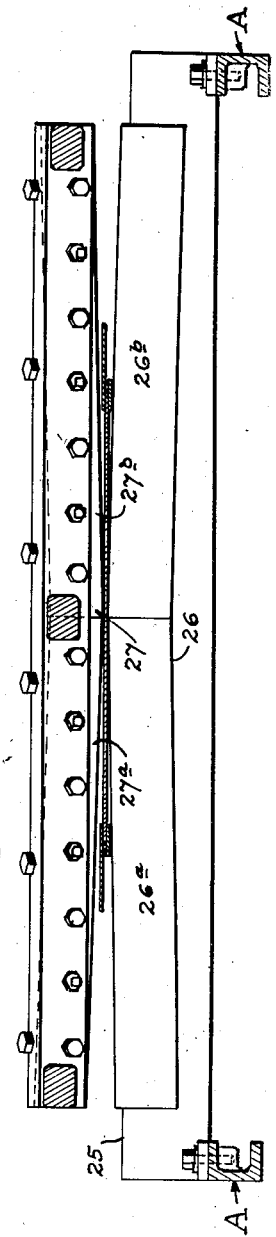
INVENTOR.
Leigh J. McGrath
BY
Chas. E. Townsend,
ATTORNEY.

Oct. 25, 1938.   L. J. McGRATH   2,134,310
SHEET CUTTING AND PANELING MACHINE
Filed Oct. 1, 1935   3 Sheets-Sheet 3

INVENTOR.
Leigh J. McGrath.
BY
Chas. E. Townsend.
ATTORNEY.

Patented Oct. 25, 1938

2,134,310

UNITED STATES PATENT OFFICE 2,134,310

SHEET CUTTING AND PANELING MACHINE

Leigh J. McGrath, San Mateo, Calif., assignor to Zellerbach Paper Company, San Francisco, Calif., a corporation of Nevada Application October 1, 1935, Serial No. 43,043

3 Claims. (Cl. 164—43)

This invention relates to a sheet cutting and paneling machine and especially to a machine adapted for the manufacture of fruit curtains of the type disclosed in a co-pending application entitled "Fruit curtain", filed August 19th, 1935, Serial Number 36,836.

The fruit curtain disclosed in this co-pending application consists of a section of thin transparent cellulose to one or both sides of which is attached by means of gummed tape a panel section. The material forming the fruit curtain, to wit, the transparent cellulose, the panel, and the gum tape, is supplied in continuous sheets or strips from large rolls. These materials are first properly positioned and assembled with relation to each other and adhesive is next applied, and the sheets are gummed with relation to each other, after which the material in assembled and gummed form is cut transversely into sheets known as "fruit curtains".

The present invention relates to a machine for positioning and assembling the several continuous sheets or strips, applying the adhesive and gumming them with relation to each other, and finally cutting the continuous sheet transversely into sections of the width and length desired; the object of the present invention being generally to improve and simplify the construction and operation of machines of the character described, to provide a machine which is automatic and continuous in operation; and, further, to provide a novel form of cutting mechanism whereby sheets of this character may be readily and accurately cut.

A machine for the manufacture of this product is shown by way of illustration in the accompanying drawings, in which—

Fig. 2 is a central, vertical, longitudinal section of the machine;

Fig. 3 is an enlarged cross section of the cutting mechanism;

Fig. 4 is a front view of the cutting knives, said view being taken on line IV—IV of Fig. 3;

Figure 1:
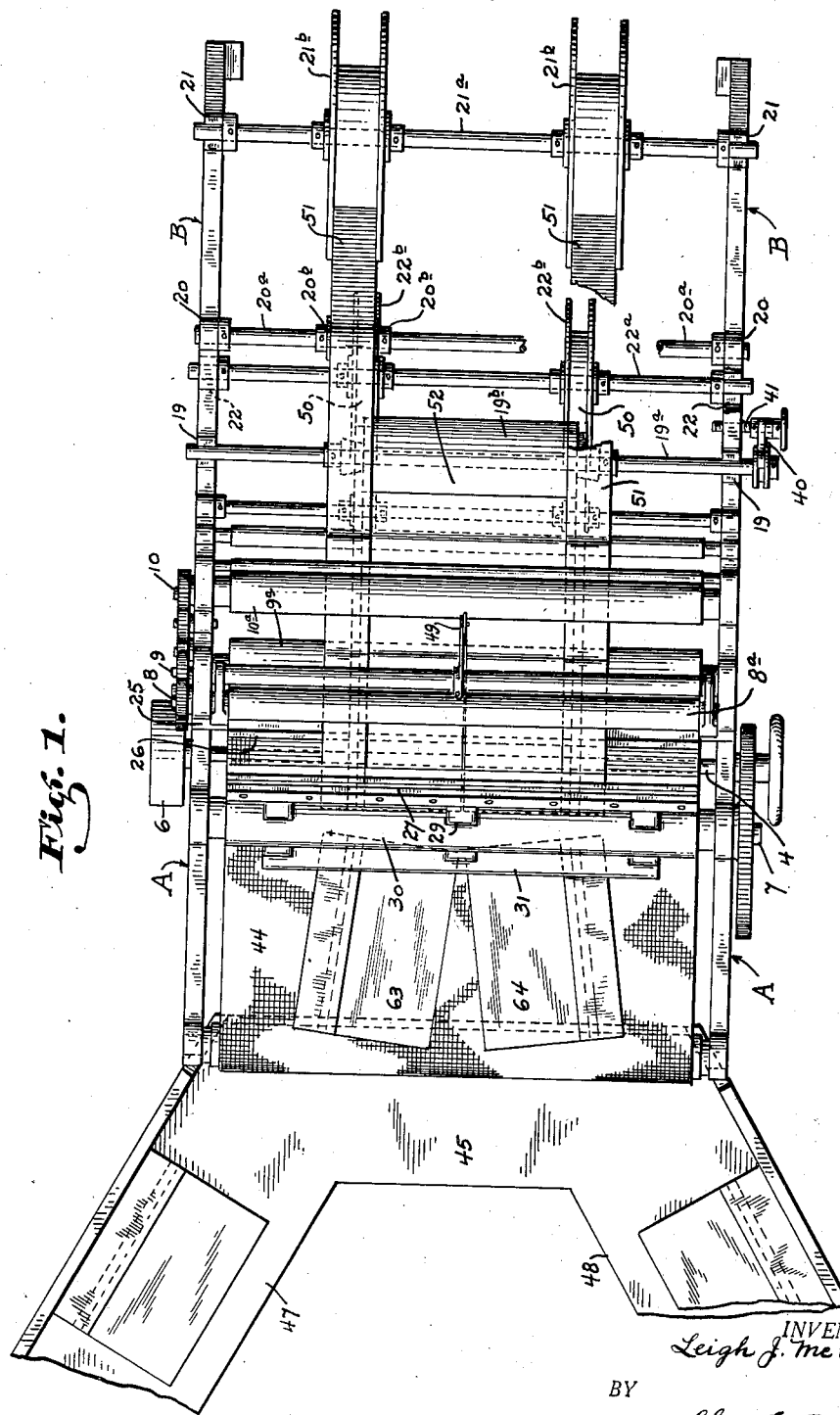
Fig. 1 is a plan view of the machine, said view being partially broken away.

Referring to the drawings in detail, and particularly Figs. 1 and 2, A indicates a main frame having a base portion 2 upon which is mounted a driving motor 3. Disposed above the motor and extending crosswise of the frame is a drive shaft 4 which is driven from the motor by means of a belt and pulley, as indicated at 5 and 6, respectively. Also, extending crosswise of the frame and journaled therein are shafts 7, 8, 9 and 10. Shafts 7, 8 and 10 are positively driven from shaft 4 through the gear trains shown, while shaft 9 carrying the roller 9ª is freely rotatable, as are the several guide rollers indicated at 11, 12, 13, 14, 15 and 16. All of the latter rollers extend crosswise of the frame and are journaled therein with the exception of the rollers 15 and 16 which are carried by an adhesive container 17.

Figure 5:
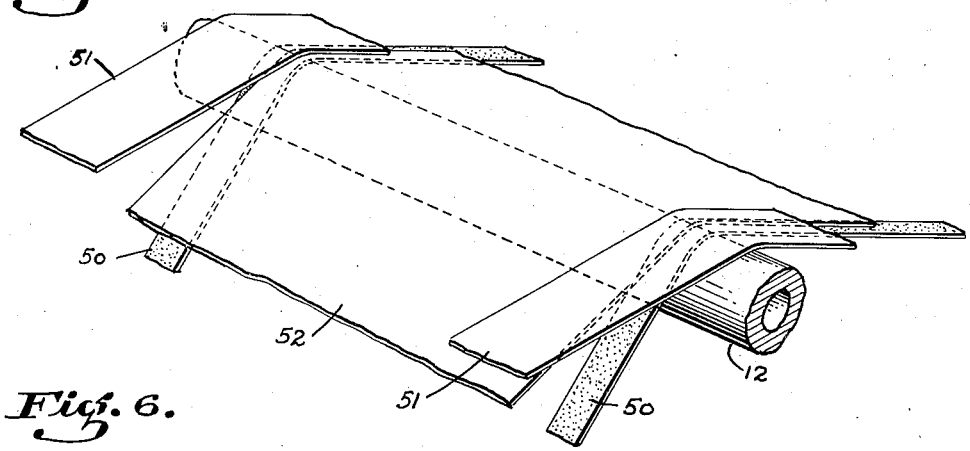
Fig. 5 is a perspective view showing the manner in which the several strips forming the product are assembled.

The main frame is provided with an extension frame B, and this carries a series of fork-shaped journals or bearings 19, 20, 21 and 22 adapted to receive and support removable shafts or arbors 19ª, 20ª, 21ª and 22ª. Shaft 19ª carries a roll of transparent cellulose 19ᵇ; shaft 20ª a plurality of guiding collars 20ᵇ, which will hereinafter be described; shaft 21ª a pair of reels 21ᵇ about which the paneling material is wound; and shaft 22ª a pair of reels about which the gum tape is wound. The strips of gum tape are indicated at 50—50; the strips of paneling material 51—51, and the transparent cellulose sheet 52, see Figs. 2 and 5.

The several materials forming the fruit curtain, to wit, the transparent cellulose, the paneling material, and the gummed tape are passed over and under the several guide rolls as shown in Fig. 2, and after passing between the rollers 8ª and 9ª carried by the shafts 8 and 9, respectively, where final pressure is applied to cause the gumming surfaces to adhere with relation to each other, a continuous assembled sheet is formed which is ready for cutting.

Figure 7:
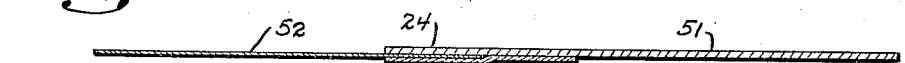
Fig. 7 is an enlarged cross section taken on line VII—VII of Fig. 6.

A transverse section of the assembled sheets, see Fig. 7, shows that the thickness of the sheet varies, being thickest in the center and thinnest at the point 24, where the several materials forming the sheet overlap. Actual practice has shown that transverse cutting of a sheet of this character proved difficult and resulted in the development of a special cutting mechanism.

The cutting mechanism is best shown in Figs. 2, 3 and 4. It consists of a cross bar 25 secured to the upper part of the main frame. This cross bar carries an adjustable stationary cutting blade 26 which is made in two sections, as indicated at 26ª and 26ᵇ, see Fig. 4. These blades are disposed on an angle with relation to each other and a horizontal line, the angle being such that a high point is presented in the center where the blades join each other and being lower at the opposite or outer ends.

Cooperating with the stationary blade just described is a movable blade 27. This is also made in two sections, as indicated at 27ª and 27ᵇ, which are adjustably secured to a cross bar 28.

These blades also present angularly disposed cutting edges which are highest at the center and lowest at the outer ends, hence when the assembled sheet is interposed between the blades, as shown in Fig. 4, the cut will be started at the center of the sheet and will then continue outwardly from the center in opposite directions. Crawling and tearing of the sheet is prevented and a straight clean cut is obtained. The cross bar 28 supporting the blade 27 is carried by arms 29 extending from a hub member 30, this being, in turn, secured on shaft 7 and being counterweighted and balanced by a weight 31. Shaft 7 is continuously rotated when the machine is in operation and one cut will, accordingly, be made during each revolution, the length of the curtain being determined by the width of the assembled continuous sheet and the width of the curtain by the speed of the feed rolls 8ª, 9ª and 10ª, and as their speed may be varied through a shifting of the gears in the connected gear trains and by expansion or contraction of the feed roller 8ª a curtain of any desired width may be obtained.

The adjustable feed is not disclosed in the present instance as it presents a standard form of mechanism employed by sheet cutting machines.

In actual operation the machine is made ready by placing the roll of transparent cellulose on shaft 19ª and, in turn, placing this in fork-shaped bearings 19 provided therefor, and similarly placing the reels 21ᵇ and 22ᵇ which supply the paneling material and the gummed tape. Shaft 19ª is provided with a grooved collar at one end and this is engaged by a fork 40 carried by an adjustable screw 41. This mechanism permits adjustment of the shaft 19ª, together with the roll of transparent cellulose carried thereby, so that it can be exactly centrally of the machine. After this adjustment has been made the reels 21ᵇ are adjusted by means of collars 42 so that the paneling material 51 will line up with and slightly overlap the outer edges of the transparent cellulose 52. The same adjustment is made with the reels carrying the gum tape by means of collars 43. The several strips are then passed over and under the several guiding and feeding rolls, as shown in Fig. 2, and when properly adjusted and positioned the machine may be operated.

Figure 6:
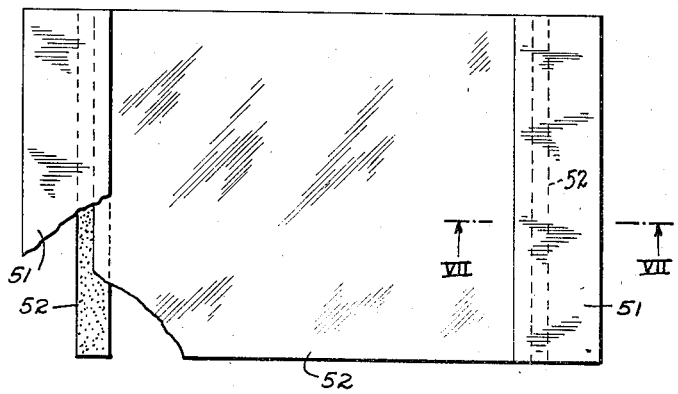
Fig. 6 is a plan view of a curtain showing a panel attached to each end thereof, said view being partially broken away to show the gummed tape.
Figure 8:
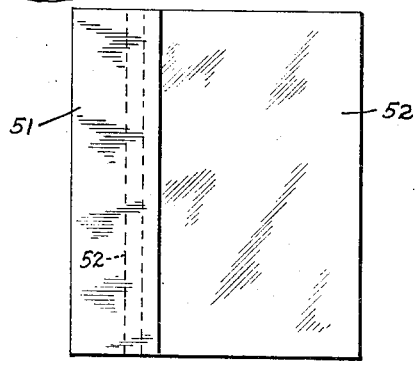
Fig. 8 shows another form of the completed product in which the panel is attached to one end only.

During operation the assembled and gummed sheet will be cut transversely by the knives 26 and 27 and the cut sections will be dropped onto a conveyor 44 driven from the drive shaft 4, as shown. This will, in turn, discharge the finished product onto a table 45 which, in this instance, is provided with two extensions, as shown at 47 and 48, this being particularly desirable where the assembled and gummed continuous sheet is slitted or cut centrally and longitudinally prior to the transverse cutting. A knife for longitudinally cutting the sheet is shown at 49 and is employed when curtains having a panel at one end only are desired, as shown in Fig. 8, but when a sheet or curtain requiring a panel at each end is required, as illustrated in Fig. 6, the knife is raised and longitudinal cutting is prevented. The paneling material, indicated at 51, is usually made of a fairly heavy grade of paper but obviously any other suitable material may be employed. The gum tape, indicated at 50, is similarly made of paper and one side thereof is gummed. Ordinary gum will, as a rule, not adhere to transparent cellulose sheets. It is for this reason that the adhesive fountain indicated at 17 is employed. This fountain contains a solution having the proper qualities, not only for wetting the gum surface of the tape, but also causing it to adhere to the cellulose sheet and to the paneling strips as illustrated; the solution employed being applied to the gum surface of the tape by means of a brush, or the like, as shown.

The paneling material, as previously stated, is wound about reels 21ᵇ carried by shaft 21ª. This material has the longest distance to travel in a machine and for this reason shaft 20ª having the guiding collars 20ᵇ mounted thereon is employed. These collars engage opposite sides of the paneling material as it is unwound from the reels 21ᵇ, and as such guides said paneling strips and holds it in proper position with relation to the outer edges of the cellulose sheet 52.

By referring to Fig. 2, it will be noted that flexible brake bands are applied to the reels 21ᵇ and 22ᵇ. These bands are indicated at 60 and 61. Ordinary canvas strips are employed which are attached at one end. The opposite ends are attached to ropes which pass over pulleys and each rope is provided with a weight 61 to apply a given tension to the flexible brake bands. This is desirable as it maintains a predetermined tension on the gummed tape strips and on the paneling material and, furthermore, prevents overrunning of said wheels when the machine is stopped. If fruit curtains of the type shown in Fig. 6 are being manufactured, one operator will suffice. He will be stationed centrally of the table 45 and will merely stack the sheets as they are cut and delivered by the conveyor belt 44. On the other hand, if curtains of the type shown in Fig. 8 are being manufactured, two operators will be necessary, one seated at the table 47 and one at the table 48; each operator stacking the separated sheets indicated at 63 and 64 as they are delivered by the conveyor belt. All other operations of the machine are entirely automatic and continuous and as such require no attention on the part of the operator or operators until the reels or rolls run empty when they have to be replaced and readjusted.

In Fig. 4 of the drawings, it will be noted that the cutting blades consist of two sections placed end to end and that these sections are disposed on an angle with relation to each other, and it will also be noted that a point of contact when the blades approach each other is at the center; hence when a sheet of material is fed between them the cutting operation will start at the center of the sheet and the cut will be outwardly. In some instances it is desirable to reverse the angular position of the sections forming a blade. For instance, it may be desirable to make the point of contact when the blades are brought together at the outer edges so that the sheet placed between them will be cut from the outer edges toward the center. This is one reason why the blades are made in sections and why they are adjustable, for adjustability of the blade sections is to vary the angle, as practical experience has shown that different types of material require different angles to produce a clean cut, this being particularly true where the sheet to be cut varies in thickness.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. In a machine of the character described a stationary elongated cutting blade and a cooperating movable blade, each blade consisting of two sections positioned end to end to assume an angle with relation to each other in a longitudinal direction so that when the movable blade approaches the stationary blade the cutting operation will be from the center and outwardly.

2. In a machine of the character described a main frame, a stationary cutting blade disposed crosswise of the frame, said blade consisting of two sections disposed end to end and positioned on an angle with relation to each other, means for adjusting said sections to vary the angles between them, a shaft journaled crosswise of the frame and parallel to the stationary blade, a counterweighted cutter bar secured to said shaft, a cutter blade secured to said bar, said blade consisting of two sections placed end to end and disposed on an angle with relation to each other, means for adjusting each section of the blade to vary the angle between them, means for rotating the shaft to swing the cutter blade past the stationary blade carried thereby, and means for feeding a continuous sheet of material to be cut over the cutting edge of the stationary blade so as to cut it into a plurality of sections of predetermined length.

3. In a machine of the character described a stationary elongated cutting blade and a cooperating movable blade, each blade consisting of two sections positioned end to end with their surfaces in the same plane to assume an angle with relation to each other in a longitudinal direction, and means for adjusting each section of each blade to vary the angle between them and in the same plane.

LEIGH J. McGRATH.